United States Patent
Bailey et al.

(10) Patent No.: US 11,320,673 B2
(45) Date of Patent: May 3, 2022

(54) SOFT CONTACT LENS COMPRISING A LENTICULAR IN A SUPERIOR PORTION OF THE CONTACT LENS WITH ENHANCED TEAR EXCHANGE

(71) Applicant: Ohio State Innovation Foundation, Columbus, OH (US)

(72) Inventors: Melissa Bailey, Gahanna, OH (US); Joseph T. Barr, Dublin, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 147 days.

(21) Appl. No.: 16/642,982

(22) PCT Filed: Aug. 31, 2018

(86) PCT No.: PCT/US2018/049084
§ 371 (c)(1),
(2) Date: Feb. 28, 2020

(87) PCT Pub. No.: WO2019/046714
PCT Pub. Date: Mar. 7, 2019

(65) Prior Publication Data
US 2020/0341298 A1 Oct. 29, 2020

Related U.S. Application Data

(60) Provisional application No. 62/553,179, filed on Sep. 1, 2017.

(51) Int. Cl.
G02C 7/04 (2006.01)

(52) U.S. Cl.
CPC ............. *G02C 7/049* (2013.01); *G02C 7/047* (2013.01); *G02C 7/048* (2013.01)

(58) Field of Classification Search
CPC ......... G02C 7/049; G02C 7/047; G02C 7/048
(Continued)

(56) References Cited

U.S. PATENT DOCUMENTS

| 4,614,413 A | 9/1986 | Obssuth |
| 4,666,267 A | 5/1987 | Wichterle |

(Continued)

FOREIGN PATENT DOCUMENTS

| CN | 1879051 A | 12/2006 |
| CN | 101506717 | 8/2009 |

(Continued)

OTHER PUBLICATIONS

Office Action and Search Report issued for Russian Application No. 2019112014, dated Dec. 14, 2020.
(Continued)

*Primary Examiner* — James R Greece
(74) *Attorney, Agent, or Firm* — Meunier Carlin & Curfman LLC

(57) ABSTRACT

Disclosed herein is a soft contact lens comprising a lenticular in a superior portion of the contact lens wherein the contact lens attaches to an upper eyelid of a wearer by the lenticular interacting with an upper tarsal plate of the upper eyelid of a wearer, wherein the contact lens is configured to provide one or more of an enhanced tear exchange, a greater tear layer thickness, or increased oxygen uptake of a cornea of a wearer.

23 Claims, 8 Drawing Sheets

(58) Field of Classification Search
USPC .................................................. 351/159.02
See application file for complete search history.

(56) References Cited

U.S. PATENT DOCUMENTS

| | | | |
|---|---|---|---|
| 4,896,958 | A | 1/1990 | Ames et al. |
| 5,056,908 | A | 10/1991 | Cohen |
| 5,104,213 | A | 4/1992 | Wolfson |
| 5,125,728 | A | 6/1992 | Newman et al. |
| 5,141,301 | A | 8/1992 | Morstad |
| 5,166,710 | A | 11/1992 | Hoefer et al. |
| 5,245,366 | A | 9/1993 | Svochak |
| 5,296,880 | A | 3/1994 | Webb |
| 5,500,695 | A | 3/1996 | Newman |
| 5,532,768 | A | 7/1996 | Onogi et al. |
| 5,764,339 | A | 6/1998 | Horton |
| 5,971,542 | A | 10/1999 | Volker et al. |
| 5,988,813 | A | 11/1999 | Neadle et al. |
| 6,092,899 | A * | 7/2000 | Wanders ............... G02C 7/043 351/159.48 |
| 6,109,749 | A | 8/2000 | Bernstein |
| 6,217,896 | B1 | 4/2001 | Benjamin |
| 6,409,339 | B1 | 6/2002 | Wanders |
| 6,491,392 | B2 | 12/2002 | Roffman et al. |
| 6,773,107 | B2 | 8/2004 | Ye et al. |
| 6,921,168 | B2 | 7/2005 | Lindacher et al. |
| 7,052,133 | B2 | 5/2006 | Lindacher |
| 7,080,906 | B2 | 7/2006 | Lindacher |
| 7,201,480 | B2 | 4/2007 | Neadle et al. |
| 7,384,143 | B2 | 6/2008 | Hall et al. |
| 7,543,935 | B2 | 6/2009 | Ezekiel |
| 7,590,056 | B2 | 9/2009 | Corley et al. |
| 7,695,135 | B1 | 4/2010 | Rosenthal |
| 7,695,435 | B2 | 4/2010 | Benson et al. |
| 8,485,662 | B2 | 12/2013 | Collins |
| 9,823,493 | B2 | 11/2017 | Caldarise et al. |
| 10,175,504 | B2 | 1/2019 | Goto et al. |
| 10,191,302 | B2 | 1/2019 | Bailey |
| 10,598,957 | B2 | 3/2020 | Bailey et al. |
| 2002/0075447 | A1* | 6/2002 | Andino ................... G02C 7/04 351/159.02 |
| 2003/0151718 | A1* | 8/2003 | Marmo ................... G02C 7/04 351/159.04 |
| 2004/0017542 | A1 | 1/2004 | Lindacher et al. |
| 2005/0068489 | A1 | 3/2005 | Hall et al. |
| 2005/0251065 | A1 | 11/2005 | Henning et al. |
| 2006/0290883 | A1 | 12/2006 | Rosenthal |
| 2008/0013044 | A1 | 1/2008 | Wanders |
| 2008/0262812 | A1 | 10/2008 | Arata et al. |
| 2010/0153081 | A1 | 6/2010 | Belletre et al. |
| 2011/0249235 | A1 | 10/2011 | Duis et al. |
| 2012/0194778 | A1 | 8/2012 | Skudder et al. |
| 2012/0271599 | A1 | 10/2012 | Lavallee et al. |
| 2013/0258275 | A1 | 10/2013 | Toner |
| 2014/0063445 | A1 | 3/2014 | Caldarise et al. |
| 2016/0091737 | A1 | 3/2016 | Kim et al. |
| 2017/0082868 | A1* | 3/2017 | Bailey ................... G02C 7/047 |
| 2019/0187488 | A1 | 6/2019 | Bailey |
| 2019/0391412 | A1 | 12/2019 | Bailey |

FOREIGN PATENT DOCUMENTS

| | | |
|---|---|---|
| CN | 102621710 | 8/2012 |
| CN | 105629504 A | 6/2016 |
| EP | 0102223 | 3/1984 |
| EP | 0887685 A1 | 12/1998 |
| FR | 2582416 | 11/1986 |
| GB | 2401954 A | 11/2004 |
| GB | 2497424 A | 6/2013 |
| JP | 11-514753 A | 12/1999 |
| JP | 2014-48666 A | 3/2014 |
| WO | 8907281 A1 | 8/1989 |
| WO | 92/22845 | 12/1992 |
| WO | 97/16760 | 5/1997 |
| WO | 98/14820 A1 | 4/1998 |
| WO | 2015194120 A1 | 12/2015 |
| WO | 2018/057234 | 3/2018 |

OTHER PUBLICATIONS

Office Action issued for Chinese Application No. 201780070220, dated Dec. 22, 2020.
Examination Report No. 1 issued for Australian Application No. 2017330483, dated Feb. 1, 2021.
Office Action issued for U.S. Appl. No. 16/782,816, dated Feb. 3, 2021.
Notice of Allowance issued for U.S. Appl. No. 16/782,816, dated Feb. 11, 2021.
Kessing, Svend Vedel. "A new division of the conjunctiva on the basis of x-ray examination." Acta ophthalmologica 45.5 (1967): 680-683.
Young, Graeme. "Mathematical model for evaluating soft contact lens fit." Optometry and Vision Science 91.7 (2014): e167-e176.
International Preliminary Report on Patentability issued for Application No. PCT/US2018/049084, dated Mar. 12, 2020.
International Search Report and Written Opinion issued for Application No. PCT/US2020/023528, dated Jun. 4, 2020.
International Search Report and Written Opinion for Application No. PCT/US2017/048617. Mailed by the U.S. International Searching Authority dated Nov. 8, 2017. 10 pages.
International Preliminary Report on Patentability issued for Application No. PCT/US2017/048617, dated Mar. 26, 2019, 7 pages.
Extended European Search Report issued by the European Patent Office in Application No. EP17853644.7 dated May 26, 2020. 10 pages.
Office Action issued by the State Intellectual Property Office of China in Application No. CN201780070220.3 dated Apr. 13, 2020. 13 pages including English translation.
Bennett, et al., Clinical Contact Lens Practice, 2005, Table 27.5. Biofocal/Multifocal Contact Lens Fitting Guidelines, p. 539.
Barr, Joseph T. "High Ametropia." Contact Lens Practice, edited by Nathan Efron, 2nd ed., Butterworth Heinemann Elsevier, 2010, pp. 298-302. (Year: 2010).
Kennard, D. W., and G. L. Smyth. "The causes of downward eyelid movement with changes of gaze, and a study of the physical factors concerned." The Journal of physiology 166.1 (1963): 178.
Kessing, A new division of the conjunctiva on the basis of X-ray examination, Acta Ophthalmologica vol. 46, 1967, 680-683.
Messer, Prescribing for Astigmatism. Taming Those Tories. Feb. 1, 2016, 2 pages.
Polse, Kenneth A. "Contact Lens Fitting in Aphakia." American Journal of Optometry and Archives of American Academy of Optometry, Mar. 1969, pp. 213-219. (Year: 1969).
Quinn, Thomas G. "Avoiding the Low Riding Lens." Contact Lens Spectrum, Jul. 1, 2000, www.clspectrum.com/issues/2000/july-2000/avoiding-the-low-riding-lens. (Year: 2000).
Rueff, et al., Presbyopic and non-presbyopic contact lens opinions and vision correction preferences, Contact Lens and Anterior Eye 40.5 (2017): 323-328.
Snyder, Christopher. "Designing Minus Carrier RGP Lenses." Contact Lens Spectrum, Dec. 1, 1998, www.clspectrum.com/issues/1998/december-1998/designing-minus-carrier-rgp-lenses. (Year: 1998).
Office Action issued for U.S. Appl. No. 16/335,999 dated Nov. 12, 2020.
Office Action issued for U.S. Appl. No. 16/782,816, dated Oct. 21, 2020.
Office Action issued for Chinese Application No. 201780070220.3, dated Sep. 14, 2020.
Examination report issued for Indian Application No. 201917014551, dated Mar. 25, 2021.
Notice of Allowance issued for U.S. Appl. No. 16/335,999, dated Feb. 18, 2021.
International Search Report and Written Opinion issued by the International Searching Authority (ISA/US) in PCT Application No. PCT/US2018/049084 dated Oct. 29, 2018. 10 pages.

(56) References Cited

OTHER PUBLICATIONS

Communication Pursuant to Rule 164(1) EPC, issued for Application No. EP18852131.4, dated May 21, 2021.
English Translation of Decision on Granting Russian Application No. 019112014/28(023349) dated Jul. 17, 2021.
Communication pursuant to Article 94(3) EPC, issued by the European Patent Office in Application No. EP 17853644.7 dated May 10, 2021. 6 pages.
Extended European Search Report, issued for Application No. 18852131.4, dated Sep. 21, 2021, 13 pages.
Office Action issued for Japanese Application No. 2019-515919, dated Aug. 17, 2021.
Office Action issued for Chinese Application No. 201780070220.3, dated Jun. 28, 2021.
Office Action in connection to Korean Application No. 10-2019-7011606, dated Jan. 7, 2022.

\* cited by examiner

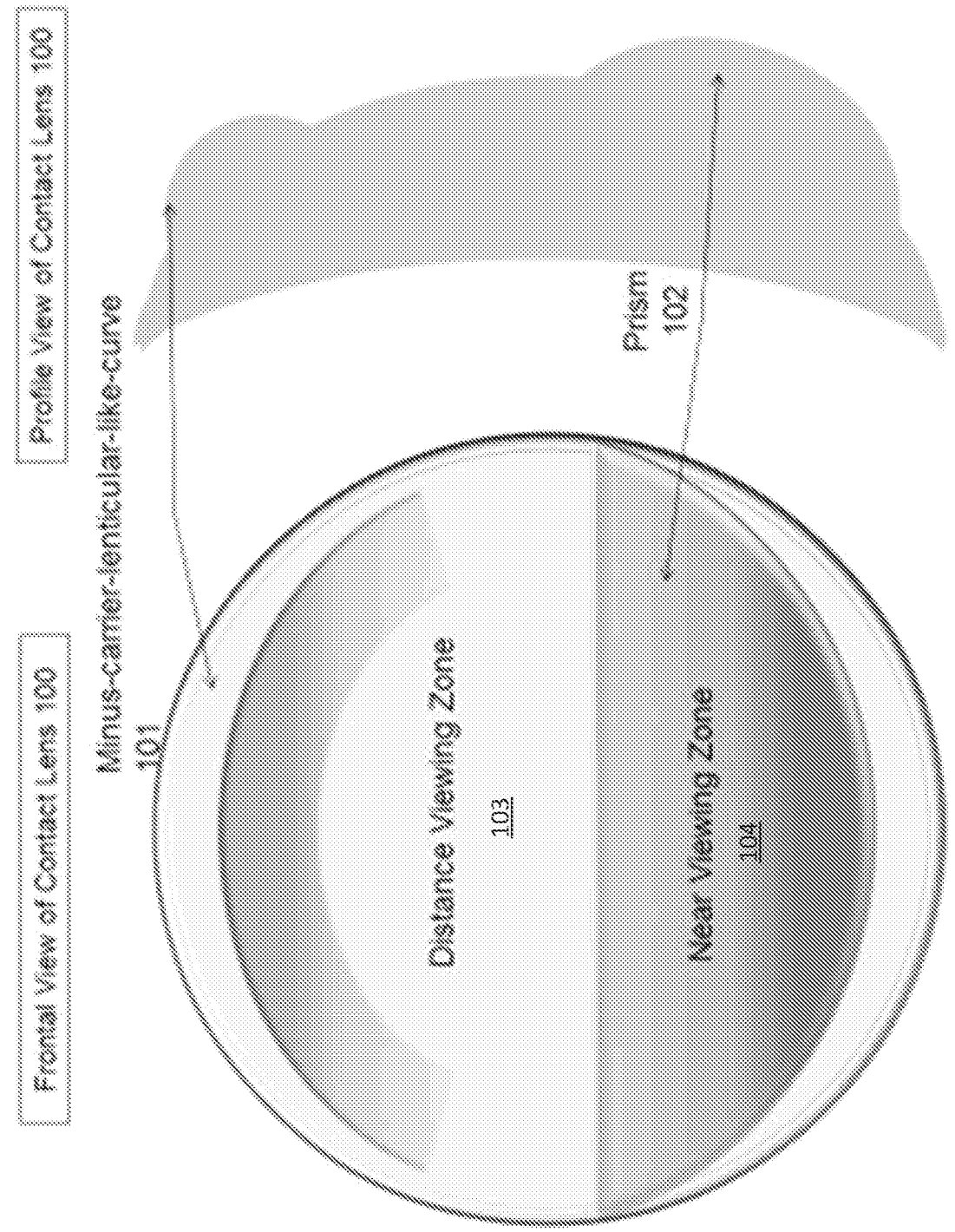

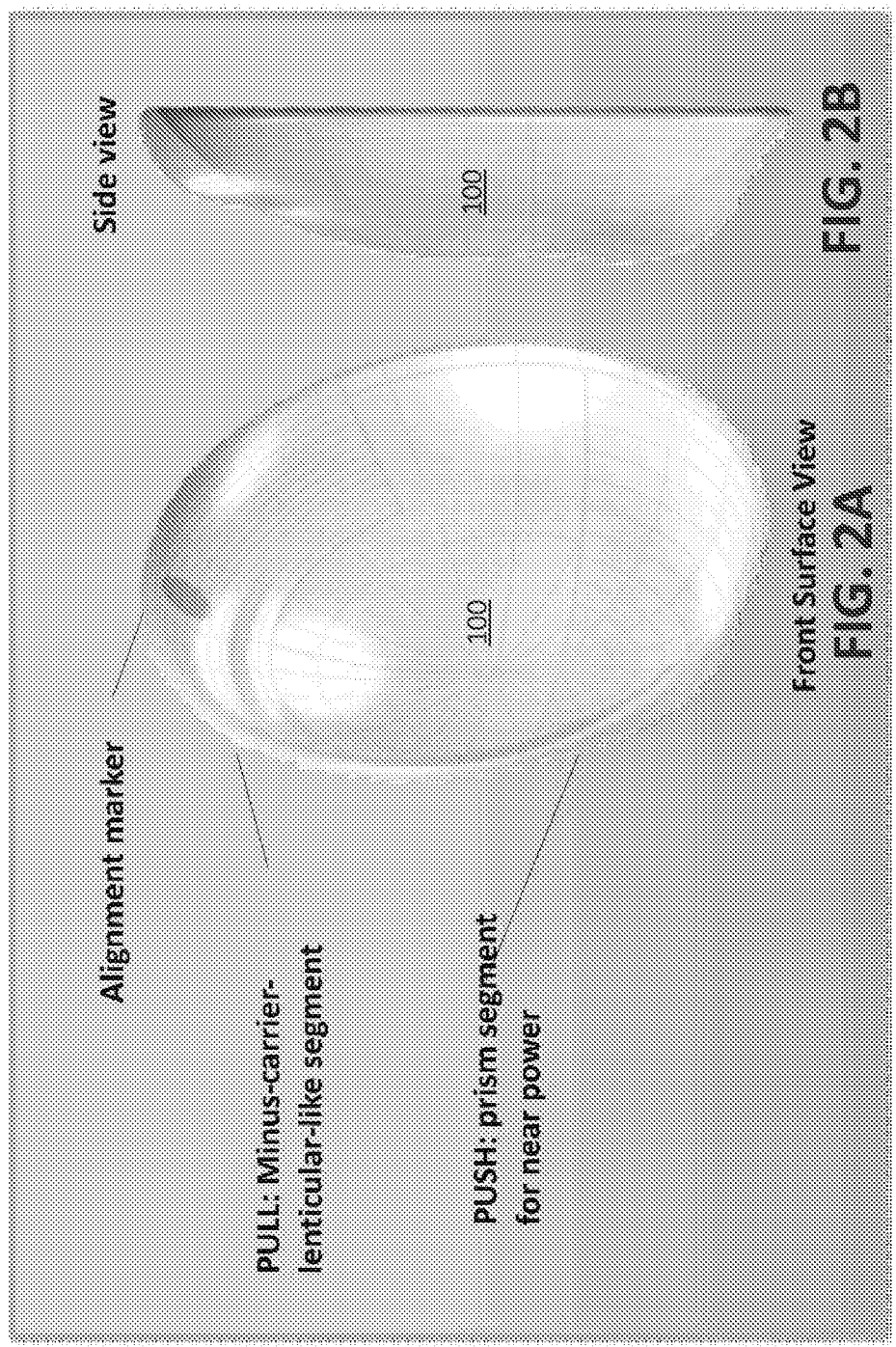

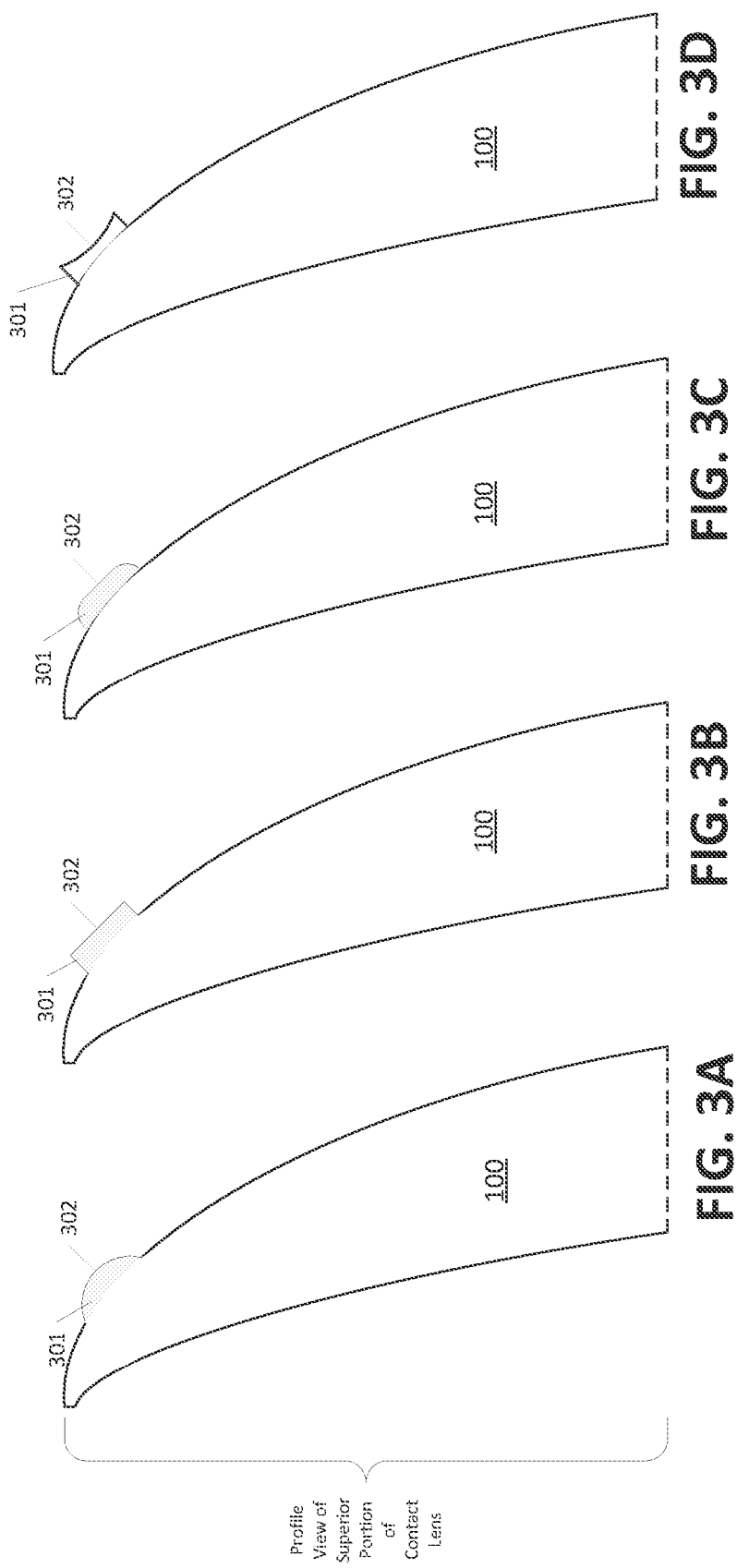

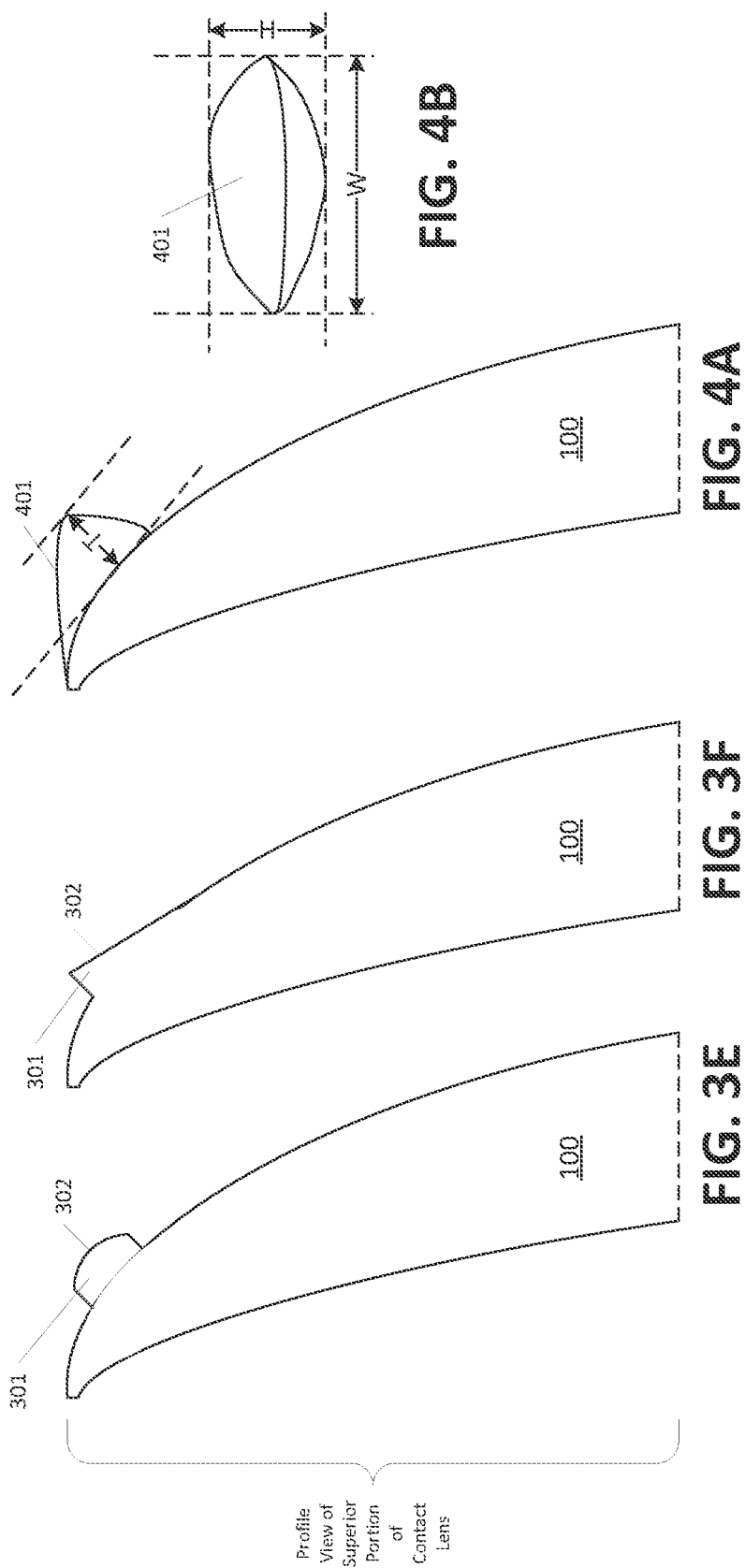

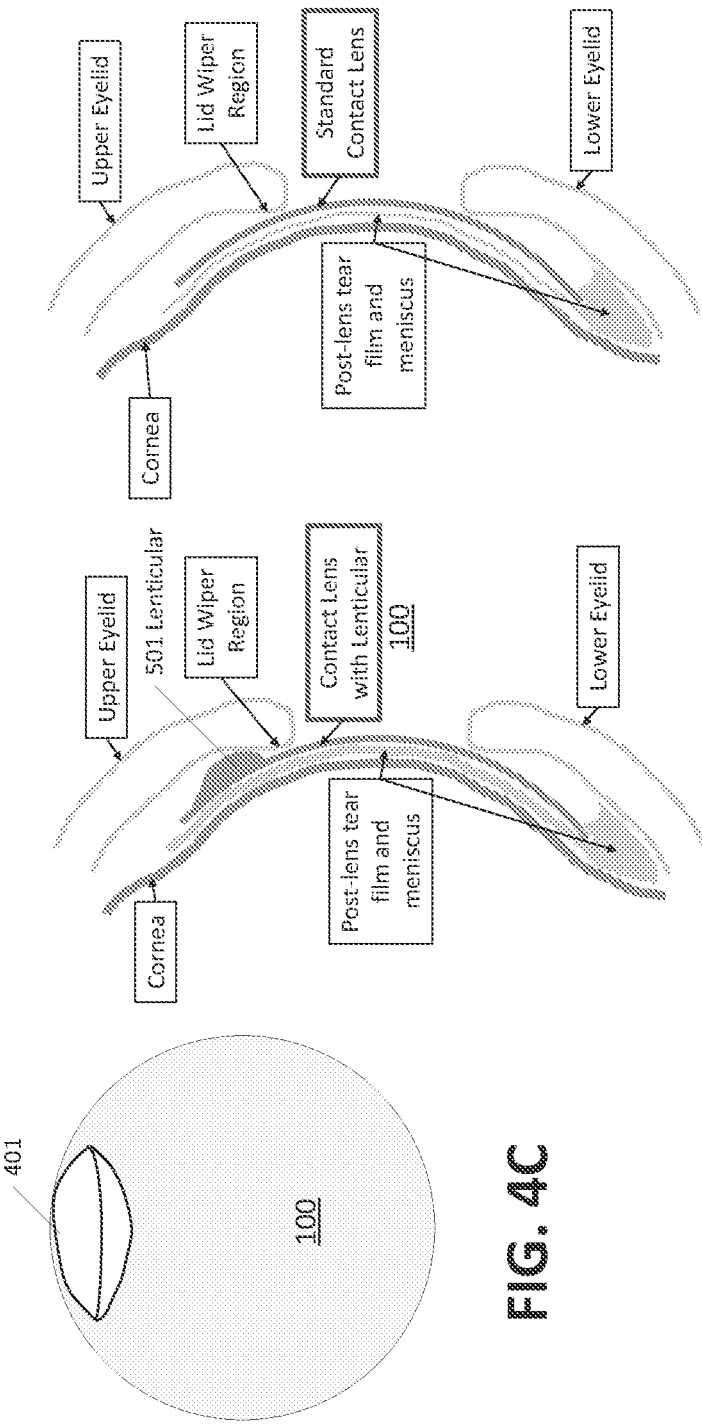

SOFT CONTACT LENS COMPRISING A LENTICULAR IN A SUPERIOR PORTION OF THE CONTACT LENS WITH ENHANCED TEAR EXCHANGE

CROSS-REFERENCE TO RELATED APPLICATION

This application is a national stage application filed under 35 U.S.C. § 371 of PCT/US2018/049084 filed Aug. 31, 2018, which claims priority to and benefit of U.S. provisional patent application Ser. No. 62/553,179 filed Sep. 1, 2017, which is fully incorporated by reference and made a part hereof.

BACKGROUND

Conventional soft contact lens are designed such that they are "fitted" to the eye in such a manner that they stay relatively stable during blinking, upgazes and downgazes. While this fitting helps maintain a wearer's vision, it often reduces tear exchange, tear layer thickness, and oxygen uptake of the cornea between the lens and the surface of the eye. If the contact lens is designed for a less "tight" fit to the eye (which can improve tear exchange, tear layer thickness, and oxygen uptake of the cornea), the lens will move during blinks, upgazes and downgazes, thus affecting the vision of the wearer, and excessive movement results in discomfort to the eye.

Therefore, what is desired are contact lenses that overcome challenges in the art, some of which are described above.

SUMMARY

Disclosed and described herein is a soft contact lens with a lid-attachment fit that is designed for enhanced tear exchange between the contact lens and the surface of the eye. The portion that is used for lid attachment (i.e., the lenticular) is placed only at the top (superior) aspect of the contact lens. With modern manufacturing capabilities, any number of shapes can be implemented to achieve the lid attachment fit. The lens is designed such that it allows for enhanced tear exchange, tear layer thickness, and oxygen levels in the tears between the lens and the surface of the eye. Such a design may include a "flatter" design (less sagittal depth) for the whole lens or one or more regions of the lens, one or more grooves in the surface of the contact lens that is in contact with the eye, holes and/or slits in the contact lens, or a "looser" fit in the eye. For example, the contact lens may be designed such that it if the lenticular was omitted from the contact lens it would move more than what is typical for a soft contact lens, i.e., 1.5 mm or more, when in place on the wearer's eye within the eye without the lenticular, but with the lenticular having achieved a lid attachment fit, the lens still moves 1.5 mm or more when in place on the wearer's eye, but the movement is controlled by the attachment to the upper lid, making the lens stable between blinks and providing better comfort than without the lenticular.

The present disclosure further relates to translating bifocal, trifocal, or multifocal contact lenses that work when the cornea is spherical or toric. For rotational stabilization, the contact lenses disclosed herein have an advantage over base-down prism, peri-ballasting, and Dynamic Stabilization in that it uses the interaction between the lenticular aspect described below and the upper eyelid tarsal plate to stabilize the contact lens and may also use the interaction between the base of the prism and the lower eyelid. Interactions between the lens and one or both eyelids provides better stabilization in the lens design disclosed herein. This same contact lens design will also allow for the contact lens to have a translational movement when the patient looks from straight ahead gaze into downgaze. Instead of pushing the base of the prism in the contact lens upwards with the lower eyelid, as much of the prior art attempts to do, this design pulls the contact lens upwards with the superior lenticular aspect. This is because the lenticular aspect allows the contact lens to use a "lid-attached" fit, wherein the lens stays with the upper lid as the patient looks downwards.

In one aspect, a soft contact lens is disclosed. The soft contact lens comprises a superior portion of the contact lens; an inferior portion of the contact lens; and a lenticular located only in the superior portion of the contact lens, wherein the contact lens attaches to an upper eyelid of a wearer by the lenticular interacting with an upper tarsal plate of the upper eyelid of a wearer, said interaction allows the contact lens to translate upwards in downgaze, and wherein the contact lens is configured to provide one or more of an enhanced tear exchange, a greater tear layer thickness, or increased oxygen uptake of a cornea of a wearer.

In various aspects, the lenticular of the above soft contact lens has a top surface, said top surface having a shape that may be flat, flat with rounded corners, concave, convex or tapered having a thicker portion closer to an edge of the contact lens, or combinations thereof.

In some aspects, the above soft contact lens may have a lenticular that is comprised of a plurality of lenticular sections located only in the superior portion of the contact lens.

In some instances, the above soft contact lens may have a lenticular wherein an edge of the lenticular closest to an outer superior edge of the contact lens is one of 0.1, 0.2, 0.3, 0.4, 0.5, 0.6, 0.7, 0.8, 0.9, 1.0, 1.5, 2.0, 2.5, 3.0, 3.5, 4.0, 4.5, or 5.0 millimeters away from the outer edge of the superior portion of the contact lens.

In some aspects, the lenticular of the above soft contact lens may be anatomically-shaped. For example, the anatomical shape of the lenticular may be designed to fit within Kessing's Space of the wearer's upper eyelid.

In some aspects, the above soft contact lens is further configured to provide the one or more of the enhanced tear exchange, the greater tear layer thickness, or the increased oxygen uptake of a cornea of the wearer by the contact lens having a shallow sagittal depth. For example, the shallow sagittal depth comprises a sagittal depth that is less than a sagittal depth of a conventional soft contact lens.

In some instances, the above contact lens may be configured to provide the one or more of the enhanced tear exchange, the greater tear layer thickness, or the increased oxygen uptake of a cornea of the wearer by the contact lens having one or more grooves in a surface of the contact lens that is in contact with the wearer's eye.

In some instances, the above soft contact lens may be configured to provide the one or more of the enhanced tear exchange, the greater tear layer thickness, or the increased oxygen uptake of a cornea of the wearer by the contact lens having one or more holes and/or slits in the contact lens.

In some instances, the above soft contact lens may be configured to provide the one or more of the enhanced tear exchange, the greater tear layer thickness, or the increased oxygen uptake of a cornea of the wearer by the contact lens having a fit to the wearer's eyes such that if the lenticular was omitted the contact lens would not have movement that was controlled by the upper eye lid.

In some aspects, the above soft contact lens with the lenticular is configured to move 1.5 mm or more when in place on the wearer's eye, but is more comfortable than the lens without the lenticular.

In some aspects, the above soft contact lens is comprised of a material that can sense light activity or molecules in the ocular environment and that contains elements that modulate light or the surrounding ocular environment. For example, the above soft contact lens may be used to display an electronically-generated and/or other virtual optically-displayed image.

In some aspects, the lenticular interacting with the upper tarsal plate of the upper eyelid of a wearer comprises the lenticular of the above soft contact lens interacting with the upper tarsal plate of the upper eyelid of a wearer to provide centration and rotational stability.

In some aspects, the lenticular of the above soft contact lens comprises between 10% and 50% of an area between an upper edge of the contact lens and a geometric center of the contact lens.

In some instances, the lenticular of the above soft contact lens comprises a relatively thick edge of the contact lens in the superior portion of the contact lens that interacts with a margin of the upper eyelid. For example, the relatively thick area may comprise a thickest portion that is 2 to 10 times thicker than any remaining portion of the contact lens.

In some instances, the above soft contact lens further comprises a base down prism located at least partially in the inferior portion of the contact lens. For example, the base down prism may comprise a thicker base of the inferior portion of the contact lens.

In some instances, the prism portion of the above soft contact lens provides a change in power from a central optic zone of the contact lens.

In some instances, an edge of the wearer's upper eyelid squeezes the thicker base of the base down prism of the above soft contact lens downwards with each blink.

In some instances, the thicker base of the base down prism of the above soft contact lens also interacts with a lower eyelid with each blink, so that the thicker base of the base down prism remains above a margin of the lower eyelid. For example, in some instances, the thicker base of the base down prism of the above soft contact lens does not slide more than 2 mm behind the lower eyelid, when in the patient is looking straight ahead and/or downwards when the eye is open and during a blink.

In some instances, the above soft contact lens is used to treat ametropia, presbyopia, other accommodative disorders, or a binocular vision disorder.

The soft contact lens of any of claims 1-26, wherein the lenticular is one of 0.1, 0.2, 0.3, 0.4, 0.5, 0.6, 0.7, 0.8, 0.9, 1.0, 1.5, 2.0, 2.5, 3.0, 3.5, 4.0, 4.5, or 5.0 millimeters away from an outer edge of the superior portion of the contact lens.

Also disclosed herein is a soft contact lens comprising a superior portion of the contact lens; and an inferior portion of the contact lens, wherein the contact lens is configured to provide one or more of an enhanced tear exchange, a greater tear layer thickness, or increased oxygen uptake of a cornea of a wearer. Such a soft contact lens may be configured to move 1.5 mm or more when in place on the wearer's eye. In some instances, this soft contact lens may further comprise a lenticular located in the superior portion of the contact lens, wherein the contact lens attaches to an upper eyelid of a wearer by the lenticular interacting with an upper tarsal plate of the upper eyelid of a wearer, said interaction allows the contact lens to translate upwards in downgaze. In some instances, the contact lens with the lenticular moves less than 1.5 mm when in place on the wearer's eye. In various aspects, the lenticular of the soft contact lens has a top surface, said top surface including flat, flat with rounded corners, concave, convex or tapered having a thicker portion closer to an edge of the contact lens, or combinations thereof. In some instances, the lenticular may be comprised of a plurality of lenticular sections located in the superior portion of the contact lens. In some instances, the lenticular may be anatomically-shaped. For example, the anatomical shape of the lenticular may be designed to fit within Kessing's Space of the wearer's upper eyelid.

In some instances, the above soft contact lens is configured to provide the one or more of the enhanced tear exchange, the greater tear layer thickness, or the increased oxygen uptake of a cornea of the wearer by the contact lens having a shallow sagittal depth. For example, the shallow sagittal depth may comprise a sagittal depth that is less than a sagittal depth of a conventional soft contact lens.

In some instances, the above soft contact lens may be configured to provide the one or more of the enhanced tear exchange, the greater tear layer thickness, or the increased oxygen uptake of a cornea of the wearer by the contact lens having one or more grooves in a surface of the contact lens that is in contact with the wearer's eye.

In some instances, the above soft contact lens may be configured to provide the one or more of the enhanced tear exchange, the greater tear layer thickness, or the increased oxygen uptake of a cornea of the wearer by the contact lens having one or more holes and/or slits in the contact lens.

In some instances, the above soft contact lens may be comprised of a material that can sense light activity or molecules in the ocular environment and that contains elements that modulate light or the surrounding ocular environment. For example, the contact lens may be used to display an electronically-generated and/or other virtual optically-displayed image.

In some instances, the lenticular of the above soft contact lens may interact with the upper tarsal plate of the upper eyelid of a wearer to provide centration and rotational stability.

In some instances, the lenticular of the above soft contact lens may comprise between 10% and 50% of an area between an upper edge of the contact lens and a geometric center of the contact lens.

In some instances, the lenticular of the above soft contact lens comprises a relatively thick edge of the contact lens in the superior portion of the contact lens that interacts with a margin of the upper eyelid. For example, the relatively thick area may comprise a thickest portion that is 2 to 10 times thicker than any remaining portion of the contact lens.

In some instances, the above soft contact lens may further comprise a base down prism located at least partially in the inferior portion of the contact lens. In some instances, the base down prism comprises a thicker base of the inferior portion of the contact lens. In some instances, the prism portion provides a change in power from a central optic zone of the contact lens. In some instances, an edge of the wearer's upper eyelid squeezes the thicker base of the base down prism downwards with each blink. In some instances, the thicker base of the base down prism also interacts with a lower eyelid with each blink, so that the thicker base of the base down prism remains above a margin of the lower eyelid. In some instances, thicker base of the base down prism does not slide more than 2 mm behind the lower eyelid, when in the patient is looking straight ahead and/or downwards when the eye is open and during a blink.

In some instances, the above soft contact lens may be used to treat ametropia, presbyopia, other accommodative disorders, or a binocular vision disorder.

In some instances, the edge of the lenticular of the above soft contact lens is 0.1, 0.2, 0.3, 0.4, 0.5, 0.6, 0.7, 0.8, 0.9, 1.0, 1.5, 2.0, 2.5, 3.0, 3.5, 4.0, 4.5, or 5.0 millimeters away from an outer edge of the superior portion of the contact lens.

Also disclosed herein is a method of making a soft contact lens, the method comprising manufacturing a contact lens comprising a lenticular in a superior portion of the contact lens, wherein the contact lens is configured to provide one or more of an enhanced tear exchange, a greater tear layer thickness, or increased oxygen uptake of a cornea of a wearer. The lenticular may have a top surface, said top surface having a shape that may include flat, flat with rounded corners, concave, convex or tapered having a thicker portion closer to an edge of the contact lens. In some instances, the lenticular is comprised of a plurality of lenticular sections. In some instances, the lenticular is anatomically-shaped.

In some instances, the above method further comprises forming a base down prism in an inferior portion of the contact lens. For example, the base down prism may be added to the lens in a second step of a manufacturing process.

Also disclosed herein is a method of treating an individual in need of vision correction, the method comprising dispensing the contact lens described above and herein to the individual, thereby treating the individual in need of vision correction, wherein the individual has been diagnosed with ametropia, presbyopia, another accommodative disorder, and/or a binocular vision disorder.

The description below sets forth details of one or more embodiments of the present disclosure. Other features, objects, and advantages will be apparent from the description and from the claims.

BRIEF DESCRIPTION OF THE DRAWINGS

The accompanying figures, which are incorporated in and constitute a part of this specification, illustrate several aspects described below.

FIGS. 1A and 1B show a lenticular 101 comprising a minus-carrier lenticular-like curve located on or proximate the superior edge of the contact lens 100.

FIGS. 1C and 1D are schematic diagrams providing frontal (FIG. 1C) and a profile view (FIG. 1D) of an alternate bifocal contact lens according to lens designs disclosed herein. FIGS. 1C and 1D show a lenticular 101 comprising a minus-carrier lenticular-like curve located further toward the center of the contact lens away from the superior edge of the contact lens 100.

FIGS. 2A (front view) and 2B (profile view) are schematic diagrams of a contact lens showing a "push" and "pull" mechanism associated with a superior lenticular and an inferior prism segment.

FIGS. 3A-3F are profile schematic images of exemplary contact lens having various shaped lenticulars in a superior portion of the contact lens.

FIG. 4A is a profile schematic image of exemplary contact lens having an exemplary anatomically-shaped lenticular in a superior portion of the contact lens.

FIG. 4B is a front view of the anatomically-shaped lenticular of FIG. 4A showing width (w) and height (h) dimensions.

FIG. 4C is a front view of a contact lens having an anatomically-shaped lenticular in a superior portion of the contact lens.

FIGS. 5A and 5B are profile images of eyes that illustrate the lid attachment fit of contact lens having a lenticular in the superior portion of the lens as compared with a contact lens that does not have a lenticular. In addition, FIG. 5A shows that the embodiments described herein allow for a thicker tear film.

DETAILED DESCRIPTION

The present disclosure now will be described more fully hereinafter with reference to specific exemplary embodiments. Indeed, the present disclosure can be embodied in many different forms and should not be construed as limited to the embodiments set forth herein.

Disclosed herein is a soft contact lens comprising a lenticular over an upper (superior) portion of the lens. For example, the lenticular may comprise a rounded, minus-carrier, lenticular-like curve over a central, upper portion of the lens, though other lenticular shapes, designs and locations are contemplated.

The various embodiments of a soft contact lens disclosed herein comprises a superior-located lenticular design that creates: (1) rotational stability of the contact lens in all gazes, (2) upwards translation, or movement, of the contact lens when the eye is in downward gaze, (3) a general, centered placement of the contact lens over the cornea and the pupil as needed as the person's gaze changes, and (4) enhanced tear exchange, a greater tear layer thickness, or increased oxygen uptake of a cornea of a wearer. "Upwards translation of the contact lens when the eye is in downward gaze" means that the contact lens is held in an upwards position when the patient looks down. The embodiments disclosed and described herein include one or more lenticulars located in a superior portion of the soft contact lens where the lenticular has any shape that would allow the contact lens to attach itself to the inside of the upper lid.

Figures 1A, 1B:
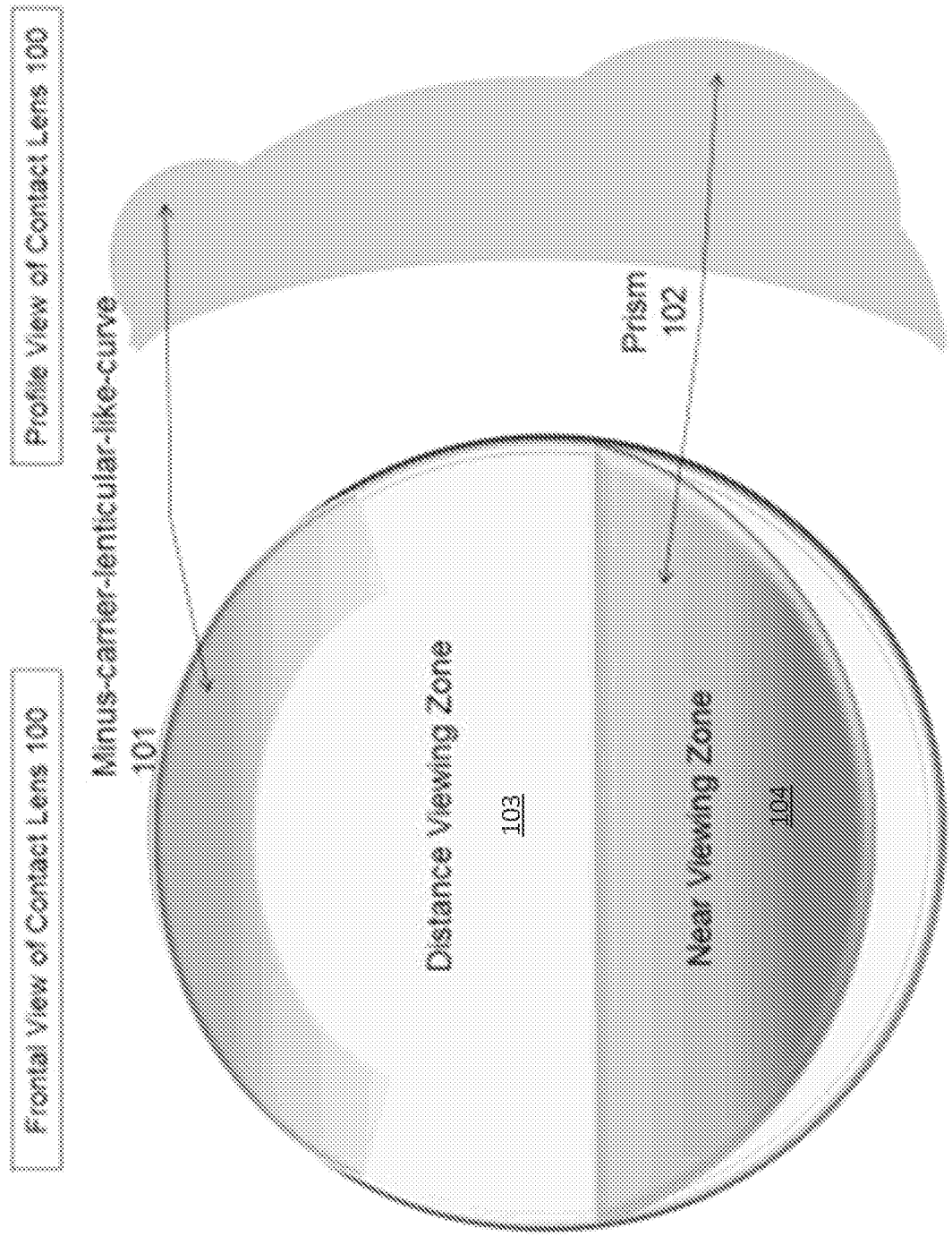
FIGS. 1A and 1B are schematic diagrams providing frontal (FIG. 1A) and a profile view (FIG. 1B) of a bifocal contact lens according to lens designs disclosed herein.

Referring to FIGS. 1A and 1B, a schematic diagram of frontal (FIG. 1A) and profile view (FIG. 1B) of a bifocal soft contact lens 100 according to lens designs disclosed herein is illustrated. The lens is bifocal in that is has a distance viewing zone 103 and a near viewing zone 104. One of the features of the contact lens shown in FIGS. 1A and 1B is the placement of a lenticular 101 over the upper, central portion of the contact lens. As described herein, the upper portion of the contact lens 100 is referred to as the superior portion and the lower portion of the contact lens 100 is referred to as the inferior portion. Generally, the lenticular 101 is located completely in the superior portion of the contact lens 100 above a horizontal midline that passes through the center of the contact lens 100; however, the ends of one or more of the lenticulars may extend into the inferior portion of the contact lens that lies below the horizontal midline. In the embodiment shown in FIGS. 1A and 1B, the lenticular 101 comprises a rounded, minus-carrier-lenticular-like-curve that extends in an arc around a portion of the upper edge of the contact lens 100, though other shapes, sizes and designs of lenticulars 101 are contemplated within the scope of embodiments of this invention and disclosed herein. Another feature of the design shown in FIGS. 1A and 1B is the possible use of prism 102 or a ballast in the lower portion of the contact lens 100. The combined features of the contact lens 100 disclosed herein provide rotational stabilization, translation, and/or centration. The lens can be made of a material that can sense light activity or molecules in the ocular environment and that contains elements that modulate light or the surrounding ocular environment, i.e., liquid crystal displays, filters, photochromatic materials, compartments containing other materials, or sensors. Though shown in FIGS. 1A and 1B as bifocal lens, it is to be appreciated that the soft contact lens 100 described herein can be of any vision including single-vision, bifocal, multifocal, and/or toric.

In FIGS. 1A, 1B, 1C and 1D, the lenticular 101 can be seen at the top of the soft contact lens 100. The lenticular 101 (in this example a minus-carrier-lenticular-like-curve) can be placed at the upper edge of the soft contact lens 100, as seen in FIG. 1B, or can be located some distance from the edge of the contact 100, as can be seen in FIG. 1D. For example, the lenticular 101 can be located in the central, upper portion of the contact lens 100. The lenticular 101 can be 0.1, 0.2, 0.3, 0.4, 0.5, 0.6, 0.7, 0.8, 0.9, 1.0, 1.5, 2.0, 2.5, 3.0, 3.5, 4.0, 4.5, or 5.0 millimeters, or more, less, or any amount in-between, away from the outer edge of the contact lens 100. A prism 102 or ballast can be located in the lower half of the contact lens 100. The use of prisms is discussed in more detail herein.

The current state-of-the-art in translating contact lenses is a rigid gas permeable contact lens. There are currently no successful soft contact lenses that achieve translating vision. All of the prior art in translating soft contact lenses moves in the opposite direction of this design, i.e., all other designs attempt to thin the upper portion of the contact lens as much as possible, rather than making it thicker and attached to the upper lid. The contact lens disclosed herein provides a translating contact lens, including a soft contact lens, which is more comfortable and requires less adaptation time than a rigid gas permeable lens. Generally speaking, patients are more willing and able to wear a soft contact lens than a rigid gas permeable contact lens, and a soft contact lens requires less expertise to fit. The current state-of-the-art in bifocal or multifocal soft contact lenses is simultaneous vision. In these lenses, both the rays focusing the distance vision and the rays focusing the near vision are within the pupil at the same time. Thus, the patient must be able to ignore the rays that are not in focus. This leads to some degradation of vision. The translating soft contact lens disclosed herein allow only light from one distance to be in focus at a time, providing clearer vision at each distance.

The other current state-of-the-art option for fitting presbyopic patients in soft contact lenses is called monovision. In this case, one eye is powered for distance vision (usually the dominant eye) and one eye is powered for near vision (usually the non-dominant eye). Some patients are unable to adapt to this type of lens, again, especially when the patient requires a greater reading add power. The difference between the two eyes becomes too uncomfortable. Also, it is well established that monovision correction in contact lenses or laser vision correction leads to a loss of depth perception. The translating soft contact lens disclosed herein allows for the use of higher reading add powers without degradation of the quality of distance vision. Because both eyes are fully and equally corrected at distance and near in the disclosed design, there is no induced loss of depth perception. The translating soft contact lens disclosed herein can also have an optical segment that provides a gradient of power change between the distance and near segments.

The contact lens disclosed herein are designed to suit many practical purposes. For example, in both rigid and soft contact lenses, the lens designs disclosed herein provide rotational stabilization in all gazes for toric contact lens designs, contact lenses designed to correct for various types of ocular aberration beyond a spherical correction, for electronically-generated and/or virtual optically displayed images, and/or bifocal or multifocal contact lenses. Additionally, the lens designs disclosed herein create upwards translation of a bifocal/multifocal contact lens in downward gaze. Furthermore, the lens designs disclosed herein achieve a "lid attached" fit similar to rigid gas permeable contact lens, i.e., keep the contact lens attached under the upper lid before, during, and after a blink.

In one embodiment, the upper portion of the contact lens interacts with an upper eyelid of the wearer. The upper portion of the contact lens that interacts with the upper lid can comprise 5, 10, 15, 20, 25, 30, 35, 40, 45, 50, 55, 60, 65, 70, or 75% of the area between the upper edge of the contact lens and the geometric center of the contact lens. For example, the area of the upper portion of the contact lens (meaning the "top half" of the contact lens, or the area between the upper edge and geometric center of the contact lens) that interacts with the upper lid can comprise 10 to 50% of the upper area of the lens.

Conventionally, a minus carrier lenticular can be used in rigid gas permeable contact lenses in order to create a lid attached fit in a plus-shaped contact lens. In the contact lens design disclosed herein, a lenticular 101 is placed in the central, upper portion of the lens only, rather than over a larger portion of the lens circumference. Some embodiments of the lens designs disclosed herein have a smaller area where a relatively thick edge is present to interact with the upper eyelid margin, and the minimal presence of the lenticular improves comfort over a more traditional minus carrier lenticular that would ordinarily be placed over the entire lens circumference. There is enough surface area and thickness of the lenticular present in the contact lens disclosed herein; however, to interact with the upper tarsal plate to assist with centration and rotational stability.

As shown in FIGS. 2A and 2B, and referred to herein as a "push" and a "pull" mechanism, in addition to the upper eyelid interacting with the lenticular, the upper eyelid can also interact with an optional prism in the lower portion of the contact lens according to the lens designs disclosed herein. The edge of the upper eyelid squeezes the thicker, base of the prism of the contact downwards with each blink. The base of the prism also interacts with the lower eyelid with each blink; therefore, the base of the prism is placed above the lower contact lens margin, high enough to remain above the lower eyelid when the eye is open. Just as multiple base curve options are available for fitting different corneal curvatures, multiple heights of the prism base are optionally used to account for differences in aperture size and position of the eyelids. In addition, multiple overall diameters of the contact lens can also be used. In other words, the prism portion can provide a change in power from the central optic zone of the contact lens. The base of the prism may not slide more than 1, 1.5, 2, 2.5, or 3 millimeters (mm) behind the lower lid, when in the patient is looking straight ahead and/or downwards when the eye is open and during the blink.

As disclosed above, the contact lens comprises a relatively thick area compared to the remaining portion of the contact lens. This area of thickness can be 1.5, 2, 3, 4, 5, 6, 7, 8, 9, or 10 times thicker than the remaining "non-thick" portion of the contact lens. For example, the relatively thick area can comprise a thickest portion, which is 2 to 10 times thicker than the remaining center portion of the contact lens.

The embodiments of contact lens disclosed herein can be used in the correction of ametropia (myopia, hyperopia, astigmatism, and/or higher order aberrations) in patients with or without presbyopia, i.e., a reading add that moves upwards through translation, in patients with other accommodative disorders, and/or patients with a binocular vision disorder can also be provided in the lens designs disclosed herein. Presbyopia affects approximately 100% of the population who live long enough (~45 years of age) to develop the condition. The embodiments of contact lens disclosed herein can also treat other accommodative disorders, or binocular vision disorder. In some instances, embodiments of the contact lens disclosed herein can be used to display an electronically-generated and/or other virtual optically-displayed image.

Conventional contact lenses provide very limited options in terms of design parameters such as diameter and curvature. The disclosed contact lenses achieve translation in a soft contact lens. Soft contact lenses are typically only feasible to manufacture in two base curve options, and very few are offered in multiple diameters. These multiple options in these two parameters in addition to the ability to vary the prism height, size, amount, or axis are optionally considered in the lens designs disclosed herein. Back or front surface toricity takes advantage of a toric, rather than spherical, corneal shape that occurs in some patients with astigmatism. The lenses disclosed herein still work when the cornea is spherical (not toric). The described lenses also have an advantage over base-down prism, peri-ballasting, and Dynamic Stabilization in that it optionally uses a lenticular aspect described above to use the upper eyelid tarsal plate to stabilize the contact lens in addition to the prismatic interaction of the lower lid (in lenses having an inferior prism or ballast). Interactions with both lids can provide better stabilization.

FIGS. 3A-3F are profile schematic images of exemplary soft contact lens having various shaped lenticulars in a superior portion of the contact lens. Each of the lenticulars 301 have a shaped top surface 302. In FIG. 3A, the lenticular 301 comprises a rounded, minus-carrier, curve 302 over a central, upper portion of the lens. As described herein, the lenticular may be on or proximate to the edge of the contact lens 100, or set back further away from the edge of the lens 100. Further, the lens 100 may include a single lenticular 301, or it can be a plurality of lenticulars having various shapes, sizes and designs. FIGS. 3B-3F illustrate non-limiting examples of profiles of various other lenticulars including a flat-topped 302 lenticular 301 (FIG. 3B), a lenticular 301 having a flat top with rounded edges 302 (i.e., a "bump") (FIG. 3C), a lenticular 301 having a concave top 302 (FIG. 3D), a lenticular 301 having a convex top 302 (FIG. 3E), and a lenticular 301 having a tapered top 302 shape that is thicker closer to the edge of the contact lens and which gradually thins toward the center of the contact lens (FIG. 3F). It is to be appreciated that the lenticulars 301 shown in FIGS. 3A-3F are intended to be non-limiting and are for exemplary purposes only. It is contemplated that the lenticulars of this invention are not limited by shape, size, number, position, or location (so long as they are substantially located within the superior portion of the contact lens).

FIG. 4A is a profile schematic image of exemplary contact lens having an exemplary anatomically-shaped lenticular in a superior portion of the contact lens. In this embodiment, the lenticular is shaped specifically to fit into a conjunctival sac and attach to the upper eyelid of the wearer. For example, the lenticular of FIG. 4A is designed to fit within Kessing's Space of the wearer's upper eyelid (see, Kessing, Svend V., "A New Division of the Conjunctiva on the Basis of X-Ray Examination," Acta Ophthalmologica Vol. 45, 1967, which is fully incorporated by reference.) FIG. 4B is a front view of the anatomically-shaped lenticular 401 of FIG. 4A showing width (w) and height (h) dimensions. In one of the embodiments, the anatomically-shaped lenticular 401 shown in FIGS. 4A and 4B is shaped and sized in accordance with the conjunctival inserts disclosed and described in U. S. Pat. No. 6,217,896, which is fully incorporated by reference.

Although volumetric and linear dimensions vary between individuals, human inferior conjunctival sacs have certain generally common features: a crescent shape horizontally; a thick inferior horizontal ridge and a wedge-like shape sagittally). In order to maximally utilize the actual volume and shape that could be contained in human conjunctival sacs, the anatomically-shaped lenticular 401 can be of a crescent shape in the horizontal plane, with the central back curvature conforming to the bulbar surface (radius of back curvature approximately 14 mm, range 12-18 mm). Most of the volume of the device is contained in the inferior 50% of the shape, within a horizontal ridge situated approximately ⅔ of the way from the top of the lenticular 401 and ⅓ of the way from the bottom of the lenticular 401. The maximum thickness of this ridge, being of a crescent shape in the horizontal plane, is a dimension noted in the table (Table I), below. The front surface of the lenticular 401 is more curved than the back in order to attain the crescent shape. The lenticular 401 tapers superiorly above the ridge, so as to situate between the tarsal plate and the globe, so that the anatomically-shaped lenticular 401 thins to an acute angle at its superior edge. Therefore, in the sagittal plane the lenticular 401 appears wedge-like above the ridge, such that pressure of the inferior margin of the upper eyelid will induce a "minus-carrier" effect and help to contain the lenticular 401 inside the cul-de sac. From the middle of the thicker volume in the ridge, the lenticular 401 tapers to blunt points nasally and temporally, such that the lenticular 401 is anchored within the tissue more tightly bound at the canthi. The horizontal length of the lenticular 401 is a dimension, covered in Table I, which is measured along the back surface of the lenticular 401 from left to right behind the ridge. At the bottom, the lenticular is rounded from left to right (radius of curvature approximately 22 mm, range 20-25 mm) and from front to back (radius of curvature approximately 0.75 mm, range 0.5-1.0 mm in the middle) with the most inferior portion of the lenticular 401 at the horizontal middle.

Below, Table I provides exemplary dimensions for three sizes of an anatomically-shaped lenticular 401 (refer to FIGS. 4A and 4B).

TABLE I

DIMENSIONS OF THREE DESIGNS OF AN ANATOMICALLY-SHAPED LENTICULAR

| DIMENSIONS | Three Designs by Size | | |
| --- | --- | --- | --- |
| | LARGE | MEDIUM | SMALL |
| Volume (μl) | 160 | 110 | 60 |
| Max. Horizontal Width (W) (mm) | 26.75 | 23.5 | 20.25 |
| Max Vertical Height (H) (mm) | 9.0 | 7.9 | 6.8 |
| Max. Thickness (T) (mm) | 2.6 | 1.7 | 0.8 |

From the thickest sagittal plane at its horizontal midpoint, the anatomically-shaped lenticular 401 to the right has a shape of equal, but opposite, conformation to that existing on the left. This is so that the anatomically-shaped lenticular 401 will be wearable in the cul-de-sac of either eye, the left/right shape difference between conjunctival sacs of the two eyes having been shown to be minimal. The vertical height of the insert (or thickness, T) (see FIG. 4A), another dimension noted in Table I, is maximum at the center of the insert and decreases left and right to the blunt lateral extremities. This is because the anatomically-shaped lenticular 401 is somewhat meniscus-shaped in the facial plane, being more convex at its inferior edge and relatively flat horizontally at the superior edge. FIG. 4C is a front view of a contact lens 100 having an anatomically-shaped lenticular 401 in a superior portion of the contact lens.

Additional non-limiting examples of anatomically-shaped lenticulars includes lenticulars having shapes that include round/oval, ellipse, triangular, heart shaped, square, pentagonal, diamond, pear shaped, rectangular, combinations thereof, and the like such that the lenticular is shaped to fit into a conjunctival sac and attach to the upper eyelid of the wearer.

FIGS. 5A and 5B are profile images of eyes that illustrate the lid attachment fit of soft contact lens 100 having a lenticular 501 in the superior portion of the lens as compared with a contact lens that does not have a lenticular (FIG. 5B). In various embodiments, the lenticular 501 may be anatomically-shaped to attach to the upper eyelid by fitting within a conjunctival sac.

The embodiment shown in FIG. 5A is configured to provide one or more of enhanced tear exchange, a greater tear layer thickness, or increased oxygen uptake of a cornea of a wearer. For example the soft contact lens can be configured to provide the one or more of the enhanced tear exchange, the greater tear layer thickness, or the increased oxygen uptake of a cornea of the wearer by the contact lens having a shallow sagittal depth. Generally, the shallow sagittal depth comprises a sagittal depth that is less than a sagittal depth of a conventional soft contact lens. See, for example, Young, Graeme; "Mathematical Model for Evaluating Soft Contact Lens Fit;" Optometry and Vision Science, Vol. 81, No. 77 pp. e167-e176; 2014, which is fully incorporated by reference, for a discussion of sagittal ("sag") depths of contact lenses. In addition to the lenticular in the superior portion of the lens, other embodiments of the soft contact lenses described herein may have one or more grooves or channels in a surface of the contact lens that is in contact with the wearer's eye. Though not comprising a lenticular, grooves or channels in the surface of the lens that is in contact with the eye are contemplated in U.S. Pat. Nos. 5,166,710 and 7,695,435 ("scalloped channels or circumferential fenestrated channels"), both of which are incorporated by reference. Holes and/or slits in the contact lens that allow for better oxygen exchange and perforated contact lens (though without superior lenticulars (are contemplated in U.S. Pat. Nos. 5,104,213 and 4,666,267, both of which are incorporated by reference. Flexible contact lens for enhanced movement on the eye and therefore more tear exchange (though also without lenticulars) are contemplated in U.S. Pat. No. 4,896,958, which is incorporated by reference. However, each of the contact lens mentioned in these patents may have excessive movement within the eye of a wearer, which can affect the vision of the wearer and/or result in discomfort. For example, such contact lens (without a superior lenticular) may have movement in any direction of 1.5 mm, or more when in place on the wearer's eye. By the addition of the superior lenticular to the contact lens, movement can be reduced to less than 1.5 mm and/or provide better centration of the contact lens thereby increasing comfort to the wearer and having less deleterious effects on vision while providing enhanced tear exchange, a greater tear layer thickness, and/or increased oxygen uptake of the cornea of the wearer.

The use of a lenticular on a soft contact lens in order to improve tear exchange also allows the contact lens to be fitted "flatter" (i.e., having lesser sagittal depth) than a conventional soft contact lens while still maintaining a comfortable fit. Such a soft contact lens includes a front-surface lenticular or other symmetric or asymmetric area at the top of the lens (a thicker region of any shape so long as it attaches to the upper lid). The purpose of the lenticular is to attach the contact lens to the upper eyelid. Once the lid attachment is achieved, that allows the back surface of the soft contact lens to be fitted much flatter, or having less sagittal depth, than conventional soft contact lens. When lenses are fitted as such, more tears can exchange behind the contact lens, allowing debris and potential infection-causing and/or inflammatory agents to be washed away with each blink. Traditional soft contact lenses, however, cannot be fitted especially flat because they are uncomfortable due to the excessive movement and poor centration of the contact lens over the cornea. Because the embodiments of soft lens disclosed herein attach to the upper eyelid, the lens movement is controlled by the lid attachment, rather than the movement of both lids and the movement of the eye, while the flatter, lower sagittal depth fitting back surface allows more tear exchange than the traditional, steeper-fitting back surface of conventional soft contact lens.

There are numerous benefits associated with soft contact lens with a superior lenticular that have enhanced tear exchange, a greater tear layer thickness, and/or increased oxygen uptake of a cornea of a wearer. Such benefits may include, but are not limited to, allowing for improved: tear film; tear film thickness and quantity; tear film turnover behind the lens; tear film composition; corneal health and oxygen; conjunctiva health; goblet cell prevalence and density; dry eye signs and symptoms including conjunctival staining, tear osmolarity, impression cytology, tear protein analysis, Mucin assay test (tear ferning), ELISA tear protein profile; Lactoferrin Microepithelial defects/aqueous adequacy 40 sec.; Fluorescein Microepithelial defects/mucus deficiency; no staining visible Rose bengal/lissamine green; Impression cytology; Epithelial cell appearance/goblet cell density; uniform biomicroscopic appearance; total lysozyme reactivity (TLR); and the like.

Figure 6A:
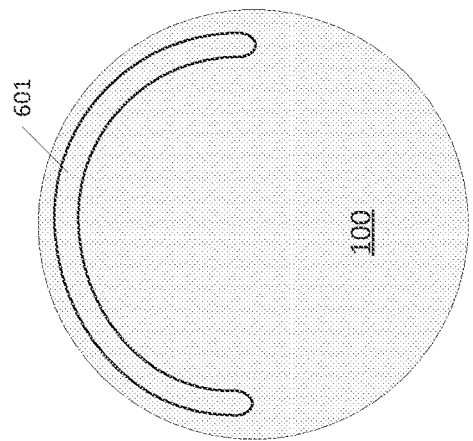
FIGS. 6A-6J illustrate front views of contact lens having non-limiting examples of lenticulars as disclosed and described herein.
Figure 6B:
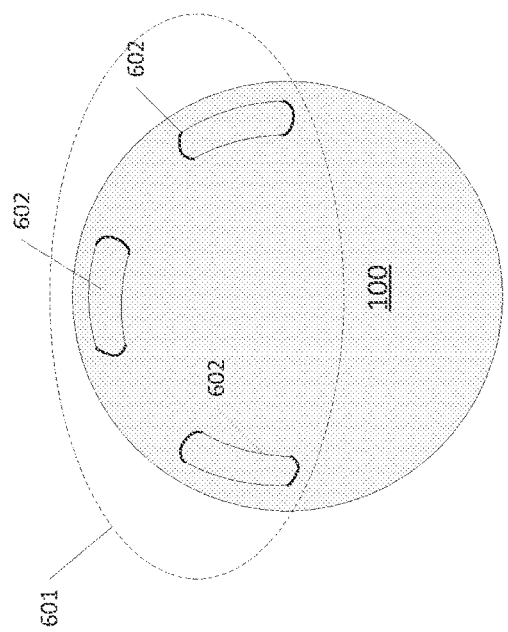
Figure 6C:
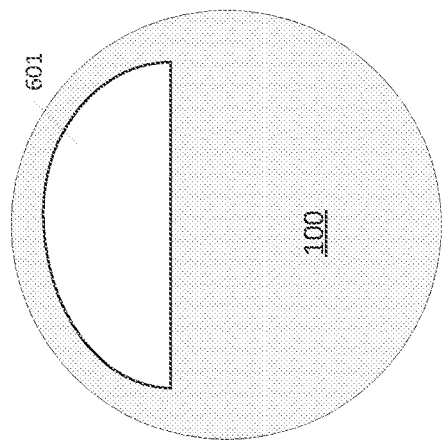
Figure 6D:
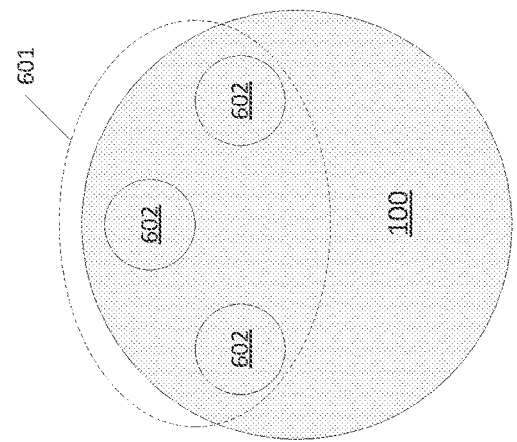
Figure 6H:
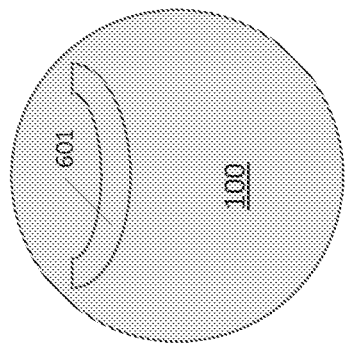
Figure 6G:
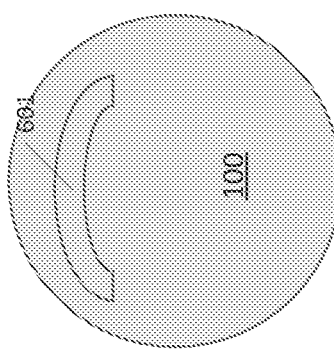
Figure 6J:
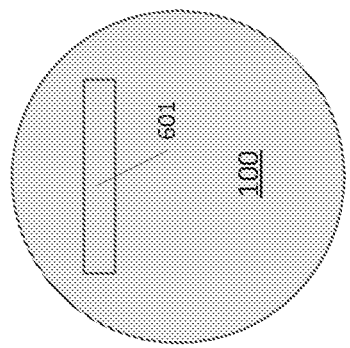
Figure 6F:
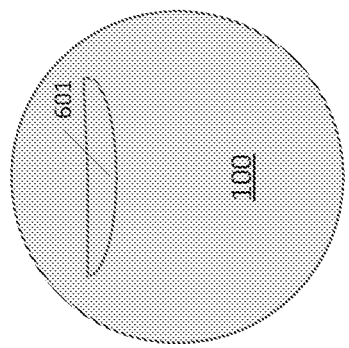
Figure 6I:
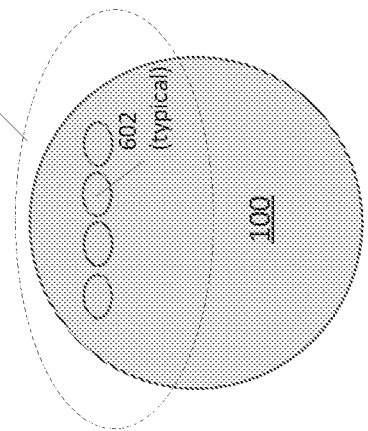
Figure 6E:
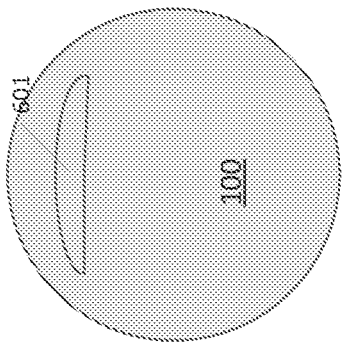

FIGS. 6A-6J illustrate front views of soft contact lens having non-limiting examples of lenticulars in the superior portion of the contact lens as disclosed and described herein. It is to be appreciated that the lenticular regions of the embodiments shown in FIGS. 6A-6J have at least a portion of the lenticular where the thickness of the lenticular is greater than the thickness of the lens at its center portion. In FIG. 6A, the lenticular 601 has a semicircular shape. In FIG. 6B, the lenticular 601 has an arc shape. It is to be appreciated that the arc length can be shorter or longer that the length shown in FIG. 6B. In FIGS. 6C and 6D, the lenticular 601 is comprised of a plurality of lenticular sections 602. For example, the lenticular 601 of FIG. 6C is comprised of a plurality of semispherical sections on the superior portion of the contact lens and the lenticular 601 of FIG. 6D is comprised of a plurality of arc sections. It is to be appreciated that the multi-section lenticulars of FIGS. 6C and 6D are exemplary and that other numbers of sections, shapes and sizes of lenticulars are contemplated within the scope of embodiments of the invention. FIGS. 6E-6J illustrate non-limiting examples of other shapes, sizes, positions and locations of lenticulars 601 that are contemplated within the scope of embodiments of the invention. Each of the embodiments shown herein may have, or may not have, prisms and/or ballasts in the inferior portion of the contact lens 100.

Also disclosed herein are methods of making the soft contact lenses disclosed herein. For example, disclosed is a method of making a soft contact lens, the method comprising manufacturing a contact lens comprising forming a lenticular in the superior portion of the lens, wherein the contact lens is configured to provide one or more of an enhanced tear exchange, a greater tear layer thickness, or increased oxygen uptake of a cornea of a wearer. The soft contact lens can further comprise a base down prism or a ballast in the inferior portion of the lens. In one example, the base down prism or ballast is added to the lens in a second step of a manufacturing process.

Also disclosed is a method of treating an individual in need of vision correction, the method comprising dispensing the soft contact lens disclosed herein to the individual, thereby treating the individual in need of vision correction. In one example, the individual has been diagnosed with ametropia (e.g., astigmatism, myopia, hyperopia). In another example, the individual has been diagnosed with presbyopia, another accommodative disorder, and/or a binocular vision disorder. For example, one or more surfaces of embodiment of the contact lens described herein can be made toric (to treat astigmatism), and/or a flatter or a steeper front surface can be formed in the embodiments of contact lens described herein (to correct either myopia or hyperopia), and/or a bifocal/trifocal/multifocal change in power can be formed in the bottom (inferior portion) of the lens to treat presbyopia.

As used in the specification, and in the appended claims, the singular forms "a," "an," "the," include plural referents unless the context clearly dictates otherwise.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A soft contact lens comprising:
   a superior portion of the contact lens;
   a lenticular located in the superior portion of the contact lens, wherein the contact lens attaches to an upper eyelid of a wearer by the lenticular interacting with an upper tarsal plate of an upper eyelid of a wearer, said interaction allowing the contact lens to translate upwards in downgaze; and
   an inferior portion of the contact lens, wherein the contact lens is configured to provide one or more of an enhanced tear exchange, a greater tear layer thickness, or increased oxygen uptake of a cornea of a wearer,
   wherein the lenticular is configured to allow the contact lens to move up to and including 1.5 mm in any direction when the contact lens is attached to the upper eyelid of the wearer by the lenticular interacting with the upper tarsal plate of the upper eyelid of a wearer.

2. The soft contact lens of claim 1, wherein the lenticular has a top surface, said top surface having a shape selected from the group consisting of flat, flat with rounded corners, concave, convex or tapered having a thicker portion closer to an edge of the contact lens, or combinations thereof.

3. The soft contact lens of claim 1, wherein the lenticular is comprised of a plurality of lenticular sections located in the superior portion of the contact lens.

4. The soft contact lens of claim 1, wherein the lenticular is anatomically-shaped.

5. The soft contact lens of claim 4, wherein the anatomical shape of the lenticular is designed to fit within Kessing's Space of the wearer's upper eyelid.

6. The soft contact lens of claim 1, wherein the contact lens is configured to provide the one or more of the enhanced tear exchange, the greater tear layer thickness, or the increased oxygen uptake of a cornea of the wearer by the contact lens having a shallow sagittal depth.

7. The soft contact lens of claim 6, wherein the shallow sagittal depth comprises a sagittal depth that is less than a sagittal depth of a conventional soft contact lens.

8. The soft contact lens of claim 1, wherein the contact lens is configured to provide the one or more of the enhanced tear exchange, the greater tear layer thickness, or the increased oxygen uptake of a cornea of the wearer by the contact lens having one or more grooves in a surface of the contact lens that is in contact with the wearer's eye.

9. The soft contact lens of claim 1, wherein the contact lens is configured to provide the one or more of the enhanced tear exchange, the greater tear layer thickness, or the increased oxygen uptake of a cornea of the wearer by the contact lens having one or more holes and/or slits in the contact lens.

10. The soft contact lens of claim 1, wherein the lens is comprised of a material that can sense light activity or molecules in the ocular environment and that contains elements that modulate light or the surrounding ocular environment.

11. The soft contact lens of claim 1, wherein the lenticular interacting with the upper tarsal plate of the upper eyelid of a wearer comprises the lenticular interacting with the upper tarsal plate of the upper eyelid of a wearer to provide centration and rotational stability.

12. The soft contact lens of claim 1, wherein the lenticular comprises between 10% and 50% of an area between an upper edge of the contact lens and a geometric center of the contact lens.

13. The soft contact lens of claim 1, wherein the lenticular comprises a relatively thick edge of the contact lens in the superior portion of the contact lens that interacts with a margin of the upper eyelid.

14. The soft contact lens of claim 13, wherein the relatively thick area comprises a thickest portion that is 2 to 10 times thicker than any remaining portion of the contact lens.

15. The soft contact lens of claim 1, wherein the contact lens further comprises a base down prism located at least partially in the inferior portion of the contact lens.

16. The soft contact lens of claim 15, wherein the base down prism comprises a thicker base of the inferior portion of the contact lens.

17. The soft contact lens of claim 15, wherein the prism portion provides a change in power from a central optic zone of the contact lens.

18. The soft contact lens of claim 15, wherein an edge of the upper eyelid squeezes the thicker base of the base down prism downwards with each blink.

19. The soft contact lens of claim 15, wherein the thicker base of the base down prism also interacts with a lower eyelid with each blink, so that the thicker base of the base down prism remains above a margin of the lower eyelid.

20. The soft contact lens of claim 15, wherein the thicker base of the base down prism does not slide more than 2 mm behind the lower eyelid, when in the patient is looking straight ahead and/or downwards when the eye is open and during a blink.

21. The soft contact lens of claim 1, wherein the contact lens is used to treat ametropia, presbyopia, other accommodative disorders, or a binocular vision disorder.

22. The soft contact lens of claim 1, wherein the contact lens is used to display an electronically-generated and/or other virtual optically-displayed image.

23. The soft contact lens of claim 1, wherein the lenticular is one of 0.1, 0.2, 0.3, 0.4, 0.5, 0.6, 0.7, 0.8, 0.9, 1.0, 1.5, 2.0, 2.5, 3.0, 3.5, 4.0, 4.5, or 5.0 millimeters away from an outer edge of the superior portion of the contact lens.

* * * * *